(No Model.)
J. BUYER.
CHISEL HOLDER FOR FILE CUTTING MACHINES.
No. 369,690. Patented Sept. 13, 1887.
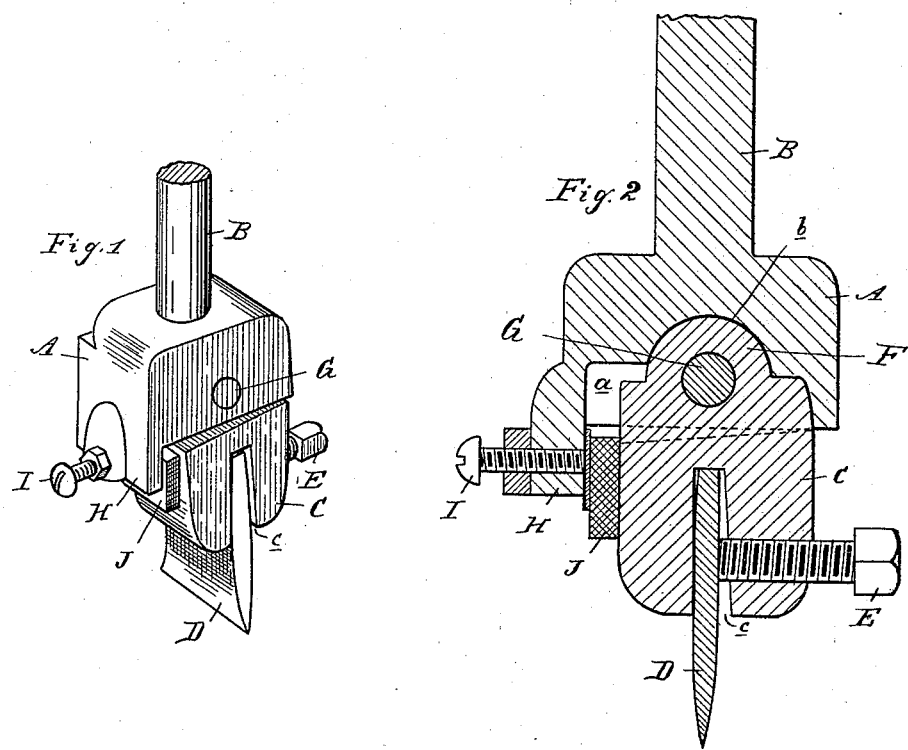
Attest:
John Schuman
Inventor:
Jacob Buyer.
by his Atty

UNITED STATES PATENT OFFICE.

JACOB BUYER, OF SANDUSKY, OHIO.

CHISEL-HOLDER FOR FILE-CUTTING MACHINES.

SPECIFICATION forming part of Letters Patent No. 369,690, dated September 13, 1887.

Application filed March 10, 1887. Serial No. 230,321. (No model.)

*To all whom it may concern:*

Be it known that I, JACOB BUYER, of Sandusky, in the county of Erie and State of Ohio, have invented new and useful Improvements in Chisels for File-Cutting Machines; and I do hereby declare that the following is a full, clear, and exact description thereof, reference being had to the accompanying drawings, which form a part of this specification.

This invention relates to certain new and useful improvements in chisels for file-cutting machines.

Ordinarily chisels of this character are rigidly secured in a head upon which the hammer acts, and, while provisions have been made for "throwing up the tooth" after each cut, still the rigidity of the chisel in cutting the next succeeding tooth destroyed, to a great extent, the burr of the tooth already formed, the least lateral resistance under the action of the chisel being found at that point. To obviate this difficulty, and to construct a chisel that will form a tooth by mechanical means equal to that formed by hand, is the object of this invention.

The invention consists, therefore, in the peculiar construction and arrangement of the chisel in relation to the chisel-head, whereby a yielding action of the chisel is obtained under the blow of the hammer for throwing up a burr after each cut, all as more fully hereinafter set forth.

Figure 1 is a perspective view of my improved device. Fig. 2 is a central vertical section of the same.

In the accompanying drawings, which form a part of this specification, A represents a suitable head provided with a tang, B, by means of which it is secured in a file-cutting machine. This head A is rectangularly recessed, as at *a*, in its lower face, the bottom of such recess being provided with a curved seat, *b*.

C is a chisel-holder, in the slot *c* of which the chisel D is secured by means of a set-screw, E. The upper end of this holder terminates in a head, F, which fits into the seat *b* of the head A, and is retained therein by means of a pivot-pin, G.

Upon one end of the head A is formed a downwardly-projecting flange, H, through which is tapped a set-screw, I, by means of which the rubber J or other suitable elastic material is retained between such flange H and the adjacent edge of the holder C.

In practice, the device described being secured in a file-cutting machine, the chisel, under the action of the hammer, cuts the tooth in the file-blank, and after each cut the holder C yields laterally against the action of the spring or rubber J sufficiently to throw up the tooth and form a burr in each succeeding tooth cut, and without destroying or flattening the burr formed in the tooth previously cut.

What I claim as my invention is—

1. The combination, with the recessed head, of a holder pivoted therein and a yielding cushion interposed between said head and holder, substantially as and for the purpose specified.

2. The combination, with the head having a recess provided with a curved seat, of a holder having a head, F, corresponding to and seated in said seat, and a pivot-pin, G, passed through said head and through openings in said head, substantially as described.

3. The combination of a head, A, holder C, chisel D, and spring J, when constructed, arranged, and operating substantially in the manner and for the purposes specified.

JACOB BUYER.

Witnesses:
H. S. SPRAGUE,
T. E. ROBERTSON.